United States Patent [19]
Andre

[11] Patent Number: 5,937,972
[45] Date of Patent: Aug. 17, 1999

[54] SUPPORT STANCHION WITH INTEGRATED RAISING MECHANISM AND UPPER STRUCTURE COMPRISING AT LEAST ONE PAIR OF FUNCTIONALLY INTERCONNECTED STANCHIONS

[75] Inventor: Jean-Luc Andre, Obernai, France

[73] Assignee: Lohr Industrie, Hangenbieten, France

[21] Appl. No.: 08/914,009

[22] Filed: Aug. 15, 1997

[30] Foreign Application Priority Data

Aug. 20, 1996 [FR] France .................................... 96 10384

[51] Int. Cl.⁶ ........................................................ B66F 7/10
[52] U.S. Cl. ........................................... 187/210; 187/216
[58] Field of Search ................................... 187/210, 213, 187/214, 216, 203, 240, 267, 268

[56] References Cited

U.S. PATENT DOCUMENTS

| | | |
|---|---|---|
| 3,021,021 | 2/1962 | Warren ....................................... 214/77 |
| 3,687,234 | 8/1972 | Gendreau ................................. 187/210 |
| 5,211,264 | 5/1993 | Beattie et al. ........................... 187/210 |

FOREIGN PATENT DOCUMENTS

| | | |
|---|---|---|
| 0540320 | 5/1993 | European Pat. Off. . |
| 0567261 | 10/1993 | European Pat. Off. . |

Primary Examiner—Kenneth W. Noland
Attorney, Agent, or Firm—Davis and Bujold

[57] ABSTRACT

A stanchion for a transport vehicle formed of a rectilinear body (1) suspended by its upper extremity (2) from an upper linear longitudinal structure (4) integral with the vehicle carriage which can be immobilized while in a working position along a carriage or a chassis of the vehicle. The rectilinear body (1) comprises an upper mechanism (3) for displacement along the upper longitudinal linear structure (4) integral with the vehicle carriage, a mechanism (11) for immobilizing the rectilinear body (1) in working position and a mechanism (6) for raising or lowering the rectilinear body (1), using a motorized force to move a movable support element (7) translationally along the rectilinear body (1), which can be immobilized in a supporting position.

26 Claims, 7 Drawing Sheets

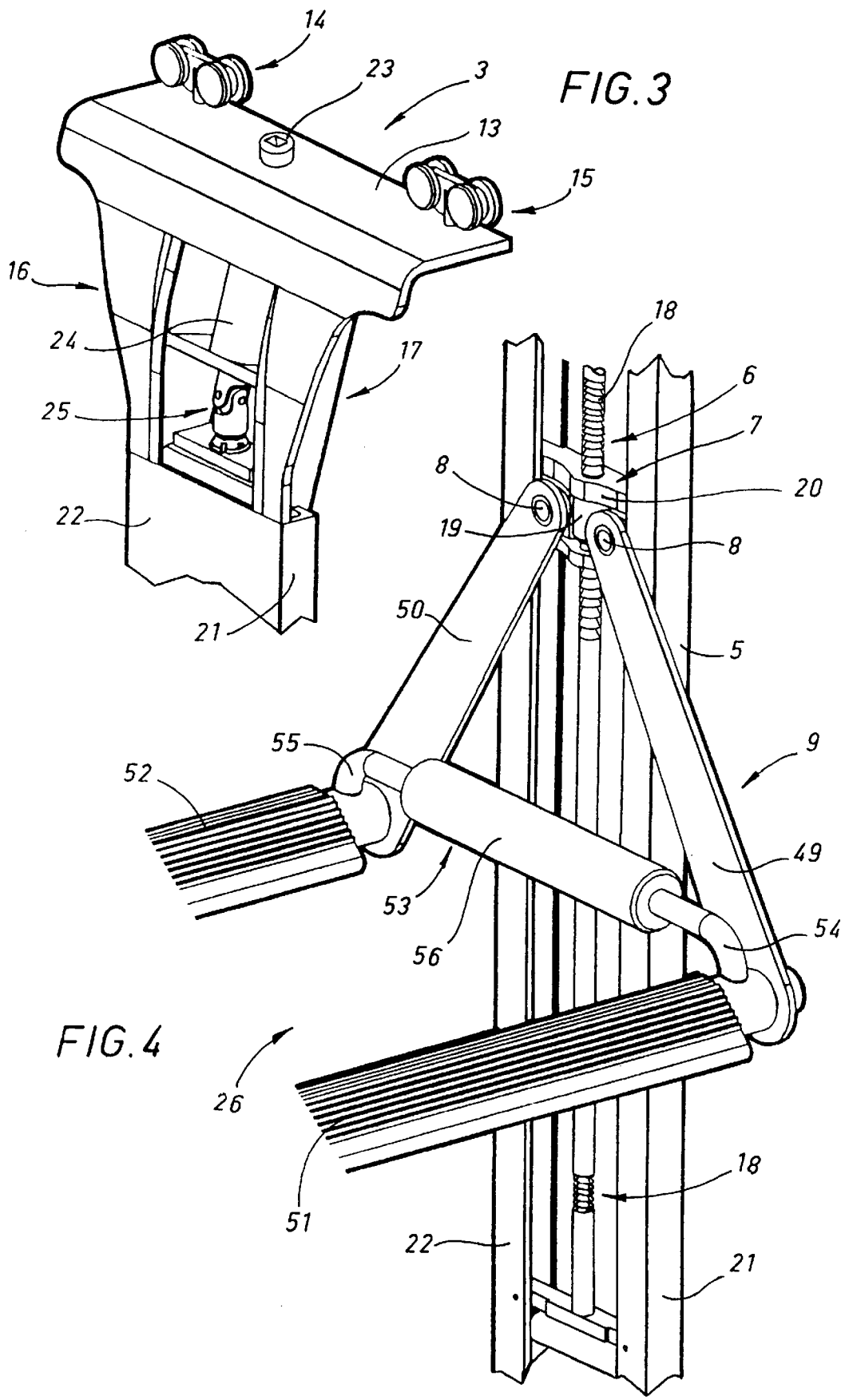

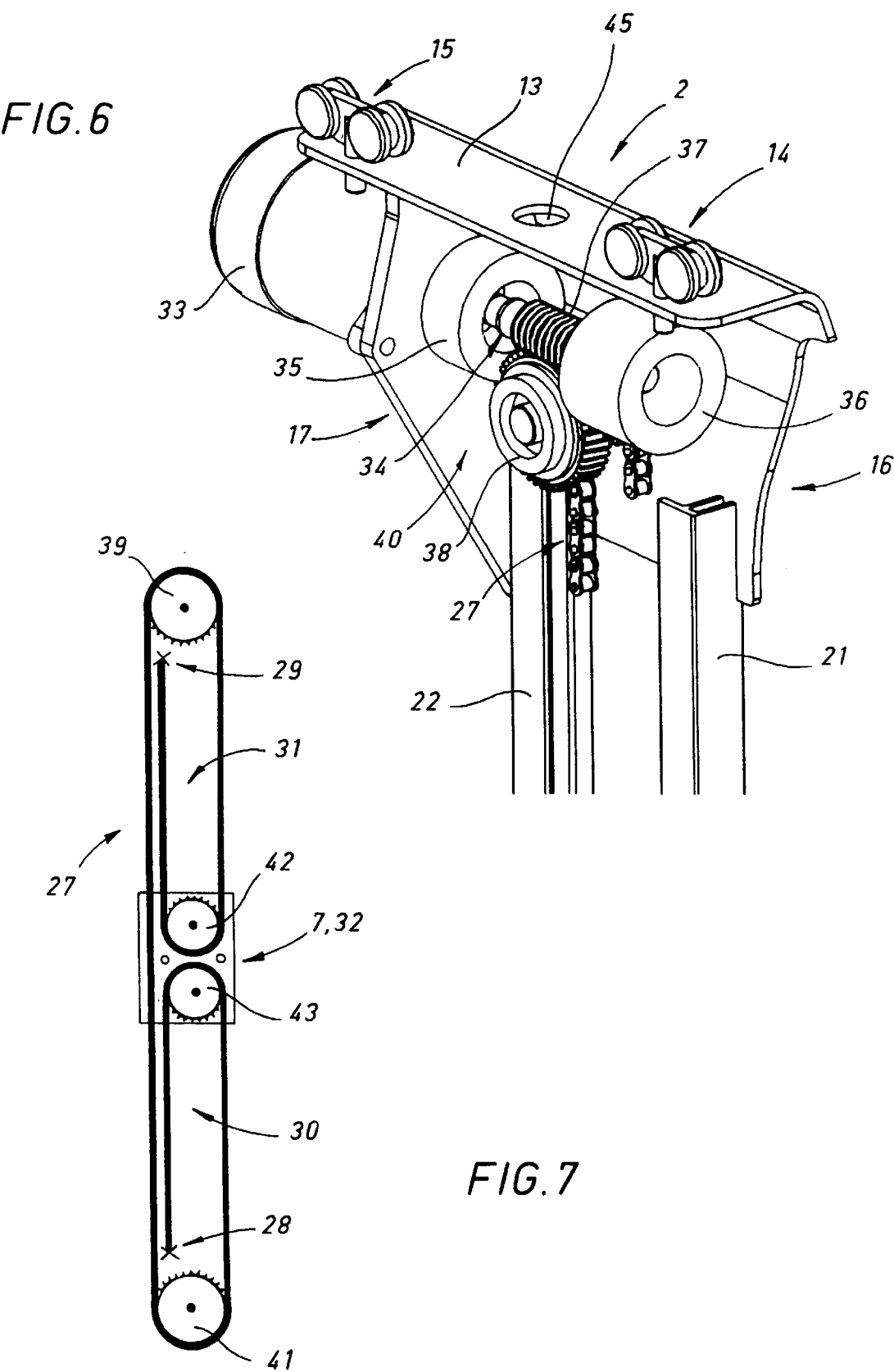

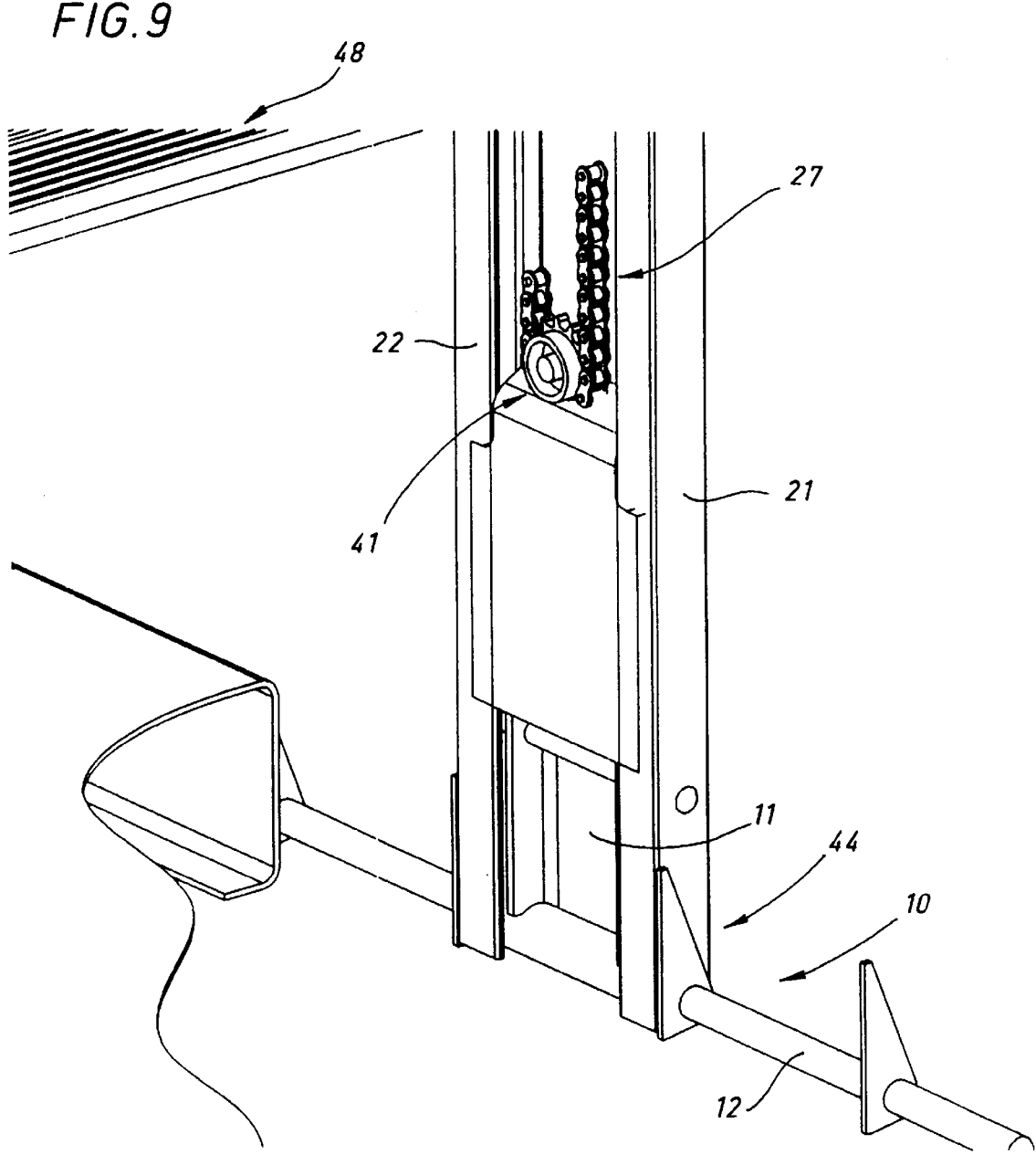

SUPPORT STANCHION WITH INTEGRATED RAISING MECHANISM AND UPPER STRUCTURE COMPRISING AT LEAST ONE PAIR OF FUNCTIONALLY INTERCONNECTED STANCHIONS

The invention concerns a movable support stanchion with an integrated lifting means designed for transporting cargo of varying heights, which allows full access from the sides and permits a general freight vehicle to be quickly converted into a specialized transport vehicle, or conversely.

The invention also concerns an upper support structure formed of two movable stanchions with integrated raising means which are positioned opposite each other and which are functionally interconnected by a transverse cargo support structure.

Covered cargo vehicles usually are surmounted by a carriage or one or more canvas covers. These covers may have lateral surfaces which can be opened in much the same way as draw curtains are opened. The curtains on the lateral surfaces are suspended from the upper portion of the coach, which is supported at intervals by posts known as stanchions.

These stanchions are merely passive supports whose function is limited to simply holding the upper structure.

Such stanchions may also be used to hold side rails, removable walls, roof portions, or other protective elements.

A vehicle so equipped is not a multi-purpose vehicle, that is, it cannot transport specialized types of cargo, since it lacks structures that can be adapted to varying requirements.

In order to have side access for loading and unloading and to reposition the stanchions, they must be removed or disconnected and moved.

It is highly desirable and more profitable for cargo vehicle owners to be able to quickly convert such a vehicle from one use to another.

The aim of the invention is to provide equipment allowing a transport vehicle to convert quickly and simply to a multi-purpose vehicle suitable for transporting specialized cargo by merely replacing the conventional stanchions with stanchions having integrated raising means, which are interchangeable with conventional stanchions at least in terms of their total width, and therefore do not infringe on the utility space in the vehicle or container.

In general, the invention offers a means of switching from one specialized use to another, or from a specialized transport application to a conventional one, and conversely.

One application of the invention is a semi-tractor trailer, container or other freight truck which converts into a trailer for transporting cars and can be rapidly converted from one to the other.

Yet another goal of the invention is maintaining full lateral access on the longitudinal surfaces, thereby conserving cargo space, through the use of movable stanchions. The stanchions can actually be detached from the longitudinal surfaces and repositioned at one end or the other.

When the invention is used on vehicles transporting cars, the distance between two successive stanchions is adapted to the wheel base of the vehicles being carried.

To achieve these goals, the invention uses a supporting stanchion and a supporting unit formed of at least one pair of two like stanchions disposed opposite each other, transversely in relation to the vehicle, and functionally interconnected.

Each movable, longitudinally displaceable, supporting stanchion has the following essential characteristics:

an upper displacement means cooperating with a linear displacement structure integral with the vehicle, to which the stanchion is attached in translation, with a degree of play;

a generally rectilinear body attached in translation to the linear displacement structure, incorporating:

a raising mechanism comprising a support element that is vertically movable in translation;

an interface with the cargo or a cargo support means that is integral or connected with the element supporting the lifting mechanism;

a lower means for immobilizing the unit in the working position along the entire length of the vehicle carriage or chassis;

an upper means for immobilization in the upper position.

Each pair of stanchions consisting of transversely opposing stanchions forming an upper structure is characterized in that the stanchions are functionally interconnected so that their movement is synchronized, with the cargo being supported by individual supports or by a transverse supporting structure interconnecting the interfaces of the corresponding movable support elements on each stanchion.

According to the principal embodiment, the supporting structure is transverse to the supporting plane of the vehicle and connects the two stanchions in a single pair to each other.

The invention also concerns two pairs of stanchions, each constituting an upper cross structure and connected to each other by a common support structure.

The significance of the invention concerns the possibility of quickly transforming a vehicle equipped with these stanchions or with support structures constructed from such stanchions into a specialized transport vehicle, and into yet another vehicle transporting either ordinary or specialized cargo.

A main feature of the invention is that a vehicle can be converted into a specialized transport vehicle without being subjected to long, costly modifications, and still maintain the original vehicle carriage structure.

This is a particularly useful feature for vehicles which occasionally transport new cars, used cars, or car wrecks.

Other characteristics and advantages of the invention will be apparent from the following description, given by way of example, with reference to the accompanying drawings, in which:

FIGS. 3 and 4 are detailed perspective views respectively showing the upper portion of one of the stanchions and the connection between the nut and the transverse support structure;

FIG. 6 is a detailed perspective view showing the upper portion of one of the stanchions and showing the engagement of the chain;

FIG. 7 is a schematic view showing the path of the chain mechanism;

FIGS. 8 and 9 are detailed perspective views respectively showing first, the connection between the translation block and the transverse support structure; and second, the lower extremity of the displaceable stanchion.

Figure 1:
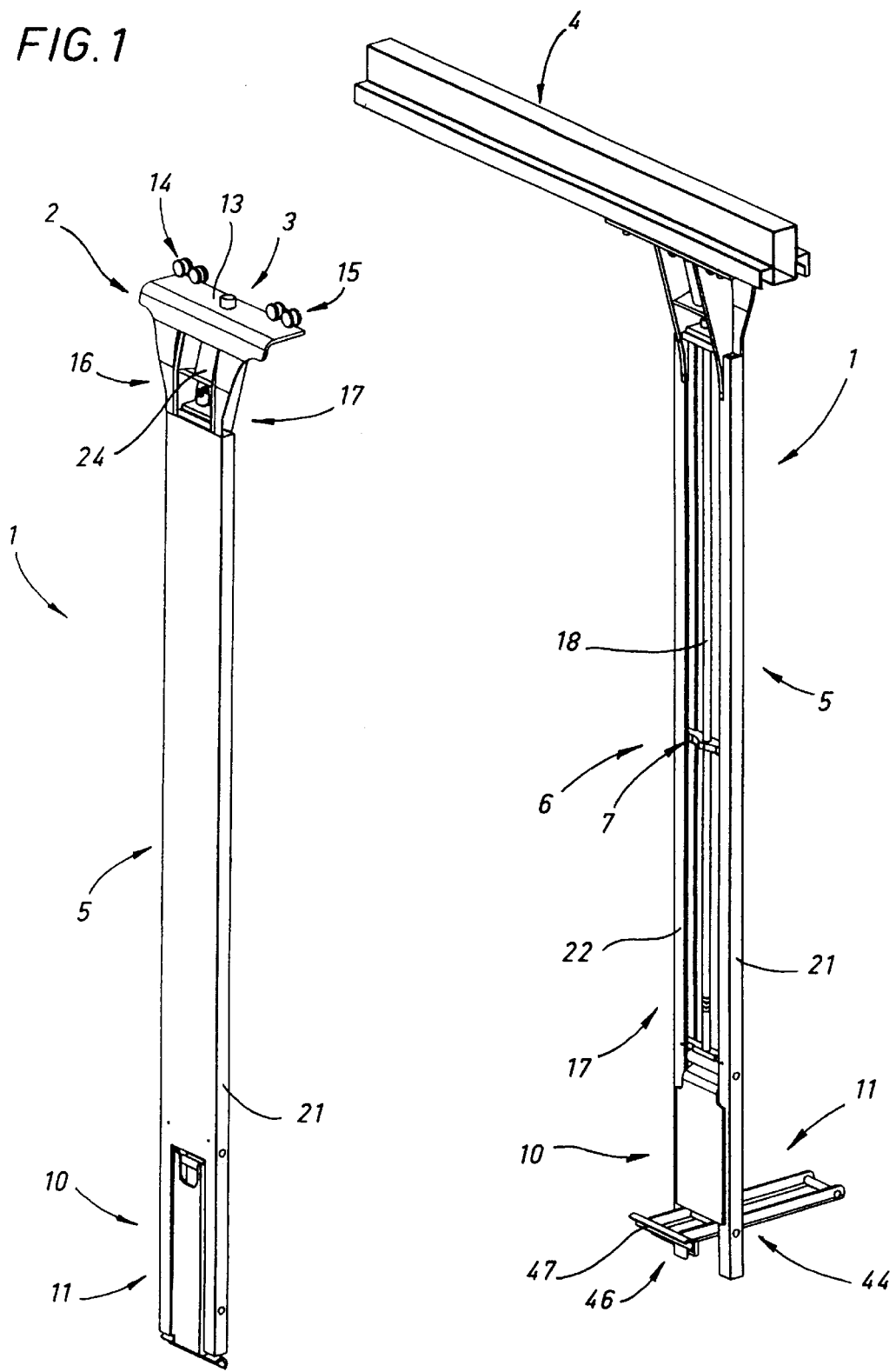
FIG. 1 is a general perspective view showing the front surface of a first displaceable post and the rear surface of a second post, the stanchions being made according to a first variation, with a screw and nut.

The description will concern itself first with the stanchions and their general characteristics, and then one or more of the variations shown.

The displaceable stanchion according to the invention consists of the following general elements.

A generally rectilinear body 1 has at its upper extremity 2 an upper displacement means 3 along a linear, longitudinal upper displacement structure 4 to which it is attached in translation, and a rectilinear portion 5 enclosing a raising and lowering means 6 with a movable support element 7 integral or connected with a cargo interface 8 or with an individual cargo support 9, and finally, at its lower extremity 10, a lower immobilizing means 11 on a longitudinal edge 12 of the carriage or chassis.

Upper displacement means 3 is made, in the variations shown, in the form of a runner 13 with pairs 14 and 15 of pulley wheels or rollers displaceable along upper linear structure 4, which may be a monorail type structure. Said linear structure 4 is integral with the vehicle carriage. The stanchion is suspended on this linear structure by upper displacement means 3, with some degree of play. Runner 13 extends into an angle towards the base 16, which engages and transmits drive to raising means 6, as explained below. The angled portion 16 then joins the rectilinear vertical portion 5 enclosing raising and lowering means 6 which raises and lower the cargo and positions it. Said lifting means has a drive mechanism 17 controlling the movable support element 7. The latter is either integral with or connected to interface 8, forming the connection with the cargo or with individual support 9 holding the cargo.

Movable support element 7 and drive mechanism 17 may be made in various ways. According to the first variation, there is a screw 18 holding a supporting nut 19 attached to screw 18 which moves in translation along the stanchion when the screw is rotated. Preferably, support nut 1 9 floats within translation block 20, forming an enclosure preventing it from rotating in relation to the screw and allowing it to act as a slide which is displaced along the two opposing slide elements 21 and 22 formed in the lateral side structures of rectilinear portion 5 or other equivalent means.

From a technological point of view, the screw is preferably the irreversible type attached by a bearing at each of its extremities and rotated by an exterior motor kinematically engaging a block 23 or the like, near displacement runner 13. The rotation is transmitted to screw 18 by a short, inclined shaft 24 mounted on joints 25.

The screw can be suspended by its upper extremity so it does not buckling.

The vertically movable support element 7 consists of a housing 20 within which translation screw 19 floats to allow functional play between the housing and the nut of the screw unit on the lifting means.

This play safeguards the connection during sudden movement, abnormal stress or resistance when movement is transmitted and converted.

Support element 7, vertically movable in translation, is integral with or connected with interface 8 which supports the cargo directly or is connected to individual cargo support 9.

Numerous types of individual supports 9 can be conceived. They could be simple supports: right angled, flat, etc., in direct contact with the cargo or with an individual intermediate support holding the cargo, or they could be more elaborate supports with single or double articulations, or even specialized single, double, or complex supports such as clamps, double arms, or other individual supports such as those adapted for transporting vehicles.

As described below, it is also possible for there to be a connection using a simple or specialized transverse support structure 26 such as a connecting rod, a cockpit, a container, or the like requiring two opposing stanchions, such a structure being the prolongation-junction of individual supports 9 of each stanchion.

If vehicles are being transported, these opposing individual supports or the transverse supporting structures receive the wheels of the vehicles to be transported.

The second variation shown in FIGS. 5 through 9 comprises several elements that are identical to the preceding variation and some which are functionally equivalent.

According to the second variation, the means 3 for displacement along upper linear structure 4 are also made in the shape of a runner 13 with two pairs of rollers or wheels 14 and 15 engaging a rail-type path or other functionally equivalent shape. For example, it might consist of a closed tubular monorail with a lower opening in which the rollers or wheels circulate, with the rectilinear body 1 of the stanchion attached thereon in translation with some play.

The raising means comprises a chain enclosed at two fixed extremities (shown by an "X" in FIG. 7), a lower extremity 28 and an upper extremity 29, forming a lower loop 30 and an upper loop 31 attached to movable support element 7, which is a translation block 32 vertically movable along the sides of rectilinear body 1.

These runner-like sides 21 and 22 may each have lower U-shaped sections opposite each other. The beams of translation block 32 are adapted to move within these slides with some functional play, in much the same way as a sliding weight.

In this version, the drive mechanism 17 for movable support element 7 generates the driving force. It consists of a lateral motor 33 synchronized with the corresponding motor or motors for the other stanchions, with the output shaft 34 of the motor being supported by two roller bearings 35 and 36, and the shaft being held between the bearings by a worm gear 37 directly engaging pinion 38 integral with an upper drive gear 39 supporting and driving drive chain 27. This unit comprises an non-reversing motor 40.

Said drive chain 27 passes around an upper gear 39 and a lower return gear 41. It forms the upper loop 31 extending between upper gear 39, an upper gear 42 of translation block 32 and its upper fixed extremity 29. The chain also forms lower loop 30 which extends between lower gear 41, a lower gear 43 of translation block 32, and its fixed lower extremity 38. This arrangement forms a block and tackle.

Functioning like a block and tackle, motorized wheel 39, when rotated in one direction or the other by reduction motor 40, raises or lowers translation block 32 along rectilinear portion 5.

To immobilize each stanchion in working position, each stanchion has an immobilization means 44, 11 at its upper extremity and its lower extremity.

The upper immobilization means consists of a block (not shown) on the upper linear structure and an opening 45 on the chassis plate of runner 13, or the reverse.

This device also exists in the first variation, although it is not shown in the drawings.

At its lower extremity 10, each stanchion has a lower means for immobilizing it in working position on an edge of the chassis or carriage, for example, element 11 of edge 12, as indicated above.

The choice of an upper immobilizing means is determined by its compatibility with the kinematics of the lower immobilizing means. Thus, upper immobilization is achieved when the stop engages in this opening, provoked by the upward movement of the stanchion body after the lower portion is locked.

The upper and lower immobilization means cooperate to completely immobilize the stanchion in working position, preferably controlled only by the locking of the lower portion.

In the embodiment shown (FIG. 2), a pivoting handle 46 is used.

This handle 46 consists of a frame pivoting on an axle transverse to the stanchion, extending into a locking element which may be in the form of a cylindrical tube 47 open along its long side and engaging a bar.

Each handle pivots between two limiting positions:

a horizontal position which unlocks the stanchion, with the handle generally extending transversely in relation to the stanchion. In this position, the stanchions can be displaced along the vehicle chassis until they are in the desired position;

a vertical position which locks and immobilizes the stanchion, with the handle lodged in a receptor opening inside the base of the stanchion and its locking end forced against a longitudinal contact element, bar, or the like attached to the sides of the vehicle chassis.

The handle tilts and it is maintained in position for locking the stanchion by the pressure of the handle lever or by pressure from an elastic recall means.

For safety reasons, a supplemental mechanical locking means may be included.

The locking sequence causes the locking stop to engage in corresponding opening 45.

Other variations of the locking device are certainly possible, such as lever systems or notched devices.

The invention also relates to a support unit consisting of at least one pair of stanchions forming an upper structure. Each pair, when independent, may be situated and locked on a random location or a specific location along the longitudinal surface of the cargo vehicle. When dependent upon one other, that is, when longitudinally connected by a support structure 26, a plate 48, a platform, etc., the pairs of stanchions are positioned or displaced together. The longitudinal distance between stanchions on the same side is determined by the length of the cargo structure.

In the case of a support unit formed of a bridge, this unit is formed of a pair of two supporting stanchions as previously described, transversely disposed opposite each other on either side of the chassis, functionally interconnected and synchronized, and possibly physically interconnected by a transverse cargo support structure. This bridge type structure is designed first, to position and support a specialized cargo, and secondly, to quickly convert a vehicle so equipped into a vehicle adapted to transport another type of cargo.

In one application, the invention allows a general freight vehicle to convert into a vehicle for transporting cars, which can then be rapidly converted to another type of vehicle, such as a general freight transport vehicle.

Figure 2:
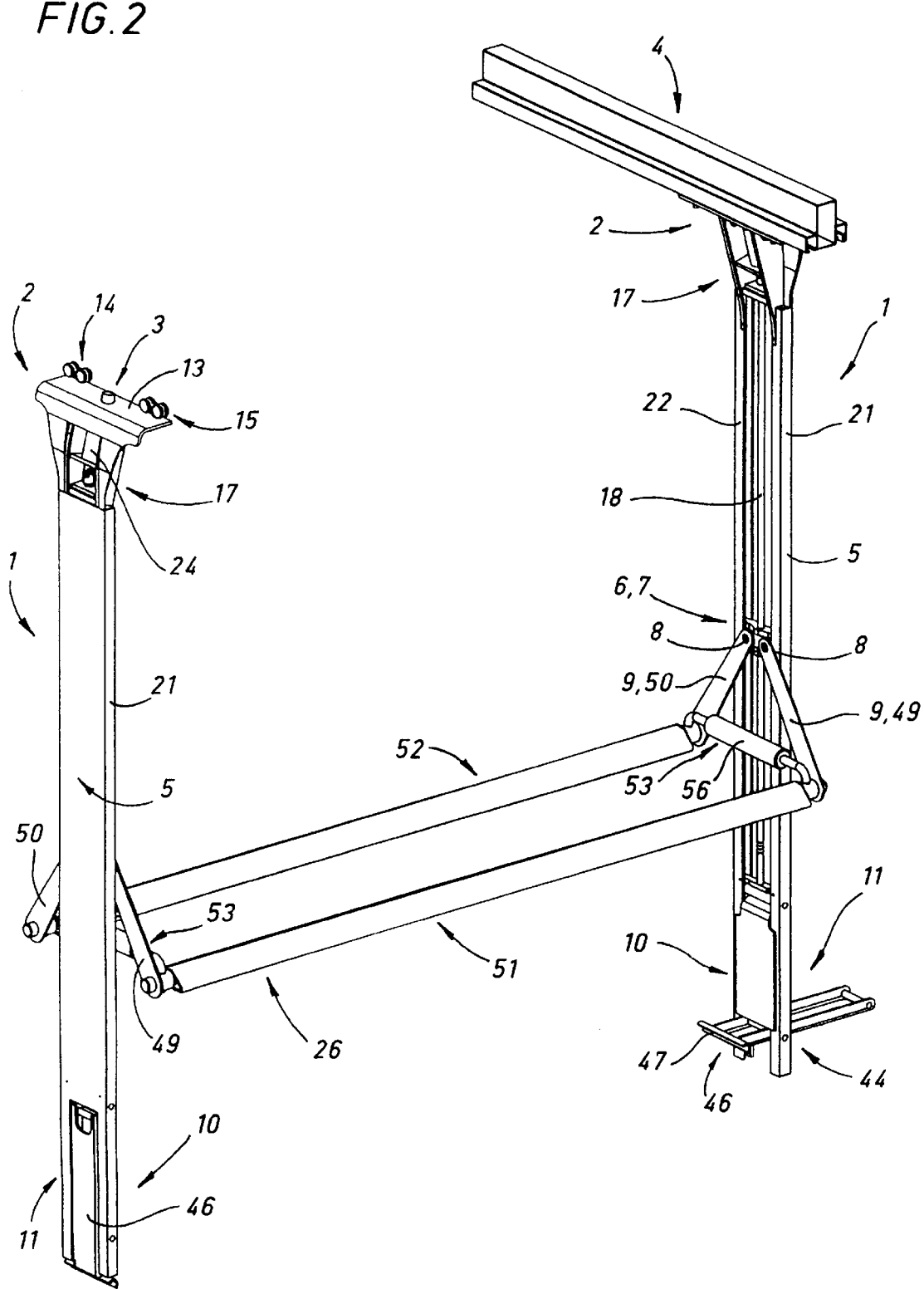
FIG. 2 is general perspective view showing a pair of stanchions joined by a transverse support structure.
Figure 5:
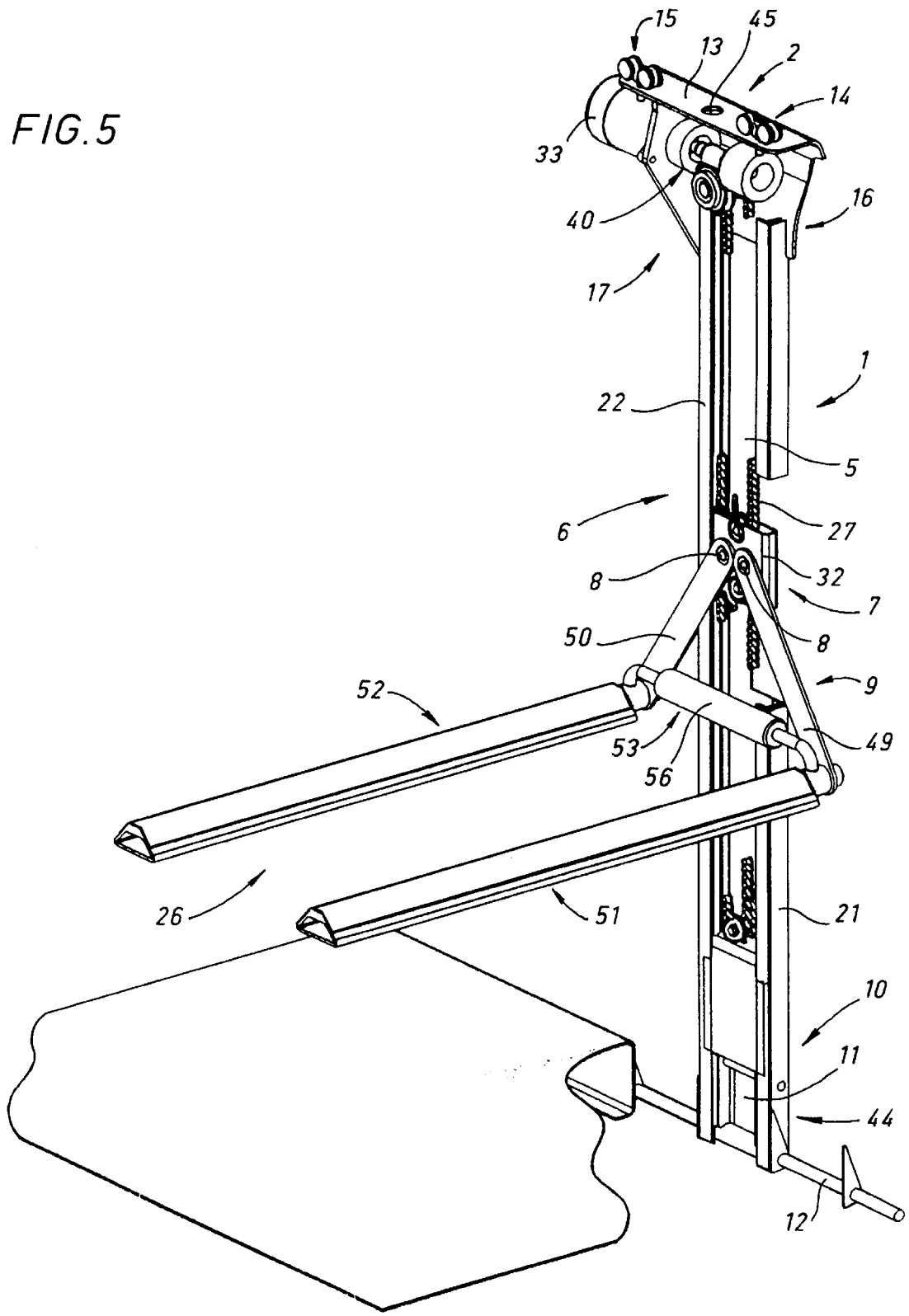
FIG. 5 is a general perspective view showing a post corresponding to the chain driven variation in working position.
Figure 8:
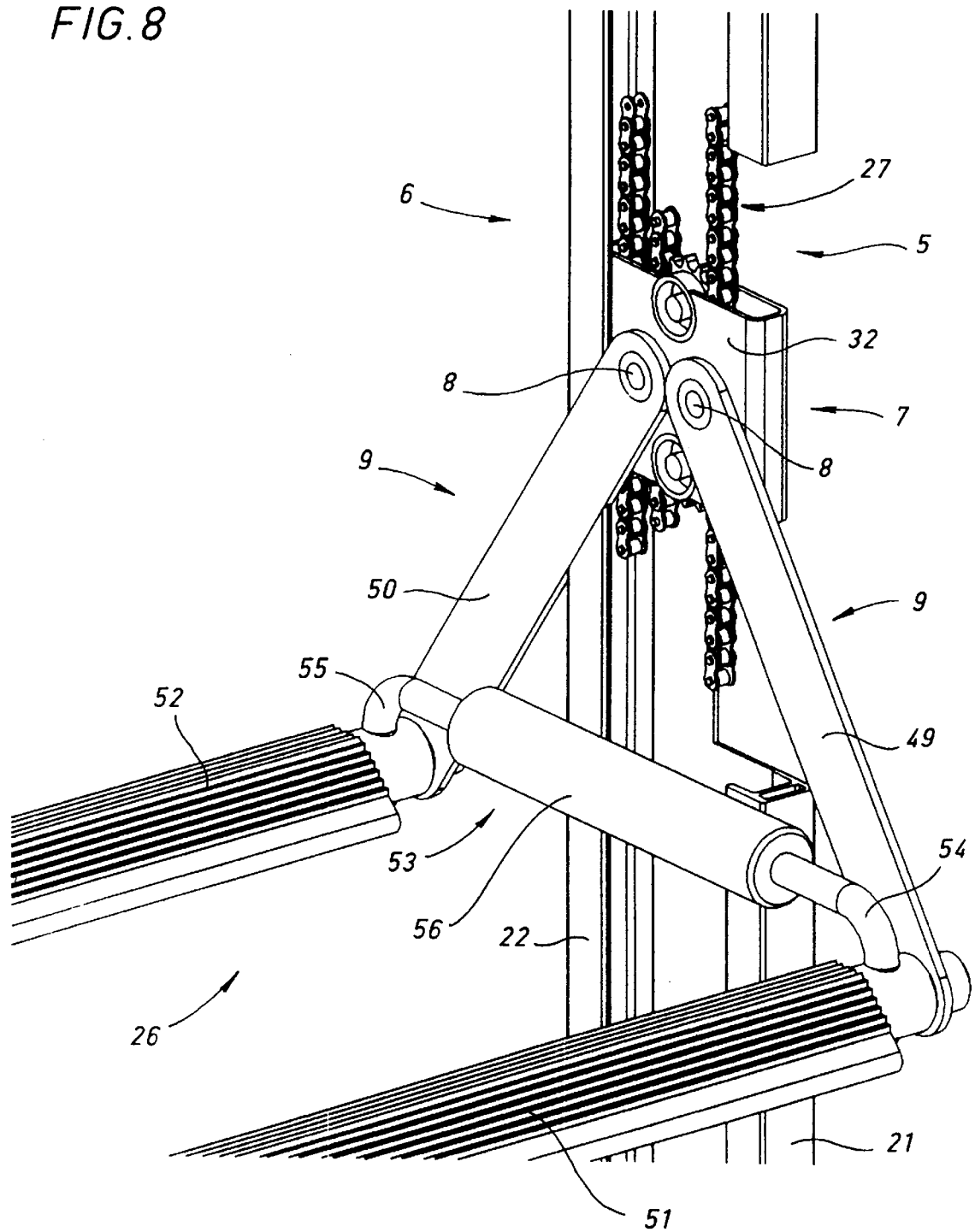

In this case, the composite supporting structure comprised of the bridge type unit which is displaceable along the vehicle is composed of a transverse supporting structure maintained by two lifting support stanchions which together form a bridge, a preferred form of which is shown in FIGS. 2 and 5.

The stanchions might also consist of only individual opposing supports 9.

Each stanchion comprises the following essential elements:

two like support stanchions which, when unlocked, are displaceable along the vehicle, either as a pair or independently;

two pairs of pulleys or rollers 14, 15 attached to the upper extremity of each stanchion and guided by an upper linear structure 4 which may take the form of an upper element forming a monorail;

two immobilizing means, a lower means 11 and an upper means 44, for immobilizing the unit in working position, which may consist of two pivoting handles 46 locking the stanchions in the desired position along the vehicle chassis;

two upper immobilizing means, for example, a stop which engages in an opening;

a common transverse supporting structure 26 or two opposing individual supports 9, which are either detachable or can be rendered inoperative, and which move in translation and pivotally in relation to the stanchions;

a connection which synchronizes the raising of the two stanchions on the bridge.

The composite bridge type of support unit is formed by associating two stanchions, such as those previously described, with a transverse connection, for example, a transverse supporting structure 26 held by two movable elements 7 supporting the two stanchions, with each stanchion being displaceable along an upper linear structure 4 such as a monorail element.

Each stanchion incorporates a raising means, for example, a motorized screw 18 or a drive chain 27 to which a translation block and its interface 8 are connected. There is only one raising means 6 for each stanchion, and the two raising elements 6 of two like stanchions are synchronized or coupled and controlled by a single motorized unit. The screws or universal joint chains are driven by individual upper or lower electrical or hydraulic motors or a distribution line through a selective or controlled intake connection.

The motorized elements may be displaceable or detachable. Thus, it is possible to use fewer motors than stanchions, for example, two motors may be connected to each of the stanchions, and then displaced to actuate each bridge in turn. The advantage of this arrangement is that the motors can be arranged or paired beneath the stanchions, thereby decreasing the total cost of the installation.

The two similar stanchions on a single bridge which are movable along longitudinal linear structure 4 are individually displaced along the upper elements toward the front or rear of the vehicle chassis either manually, using their own individual controls, or using the control unit for the movable transverse structure.

To immobilize it in working position, each stanchion has at its upper extremity and its lower extremity an immobilizing means 44 and 11, as previously described. The immobilization units ensure that each stanchion remains in a fixed position on at least one predetermined location along the chassis.

Transverse support structure 26 may resemble a conventional design or it may have specialized features. Each raising means is a unit formed of a translation block movable along the rectilinear body, for example, the housing for a translation screw, a sliding weight, or a translation block controlled by the screw or the chain and connected to the transverse supporting structure by interface 8 in the form of a fork with a pivot-support articulation or connecting axles.

The transverse supporting structure 26 has either a conventional design or specific features. Each raising element is a unit formed of a translation block movable along a rectilinear element, such as the housing of a translation screw or a slide or a translation block driven by the screw or the chain, and connected to the transverse supporting structure by an interface 8 in the form of a fork with a pivot-support articulation or by connecting axles.

The transverse structure can be both tilted and displaced in relation to its two supporting stanchions. To completely empty the cargo area, the transverse cargo structure can be removed or lowered to the ground, or even temporarily disengaged to free the interior space for general freight transportation.

The removable or displaceable transverse cargo structure may generally resemble those shown in FIGS. 2, 4, 5, 7 and 8.

At each end it has an articulated connection formed of two oblique rods 49 and 50 which are thin and flat, arranged in an upside-down "V." Each rod is pivotally articulated at its upper end to the end of the movable support element on each stanchion by an axle forming a cross piece 8, and at its lower end, to the extremity of one of the two elements constituting the transverse carrying structure.

According to the embodiment shown, the transverse carrying structure is composed of two parallel cross beams 51 and 52 in the form of bars, the ends of which are pivotally connected to the ends of the rods. Parallel cross beams 51 and 52 are maintained at a constant distance from each other by a removable cross piece 53, which may be adjustable, and which, in the example shown, is made in the form of a rod with angled extremities 54, 55 engaging the openings provided at the extremities of the cross beams.

In order to fulfill this purpose, the rods are flat and thin. For this reason, it is necessary to have a supplemental means for absorbing transverse stress and also limiting any vibrations which may occur.

An inventive means of accomplishing this is to provide a roller 56 attached so that it rotates on the rod-cross piece assembly. The roller is thick enough and positioned in such a way that it either permanently or occasionally contacts the front surface, or specifically, the flat surface returns on the flanges on the side of each rectilinear body of each stanchion, serving as a guide path for the roller. Of course, other equivalent means of limiting and absorbing lateral stress could be provided.

To change the configuration from a general freight transportation system to a specialized one, each stanchion is individually displaced by positioning one opposite the other in a predetermined place on the vehicle chassis. The stanchions are immobilized in position and the bridge is then formed by affixing the transverse carrying structure, for example, by joining supporting cross beams 51, 52 to the rods and then positioning the cross pieces.

To reverse the transformation process, first the cross pieces are removed, next the bars are unfastened, then the rods are removed or left hanging, and finally the movable stanchion element is lowered to the floor. Rods 49 and 50 separate upon contact with the floor and lodge in a horizontal position along the interior sides of the vehicle.

Since rods 49 and 50 are so thin, they can remain suspended along the body of the stanchion.

The invention also encompasses the association of two pairs of stanchions with an ordinary cargo structure such as a platform, a loading bridge, or a loading surface such as an individual support platform 48 on a road vehicle. Such a structure can be raised and lowered using the raising means associated with each post. It can also be inclined if suitable articulations are used to connect it to each stanchion and if there is a synchronized means for controlling the lifting elements.

With this invention, a cargo vehicle can be transformed into a vehicle suitable for carrying any type of load, such as specialized cargo, through a rapid, simple and efficient process, using a general freight vehicle previously equipped with conventional stanchions. A vehicle so equipped can be modified and adapted for any type of cargo, particularly specialized cargo, by the simple operation of merely moving and repositioning the movable elements and/or detachable structures.

The motors and their control units can be positioned or installed on the cargo base of a vehicle equipped in accordance with the invention.

I claim:

1. A stanchion for a transport vehicle comprising:
   a longitudinal linear structure (4) being integral with a body of said transport vehicle;
   a rectilinear body (1) being suspended by an upper extremity (2) thereof, from said linear longitudinal structure (4),
   wherein the rectilinear body (1) comprises:
      an upper engagement device (3) for translational displacement of the rectilinear body (1), the upper engagement device constrained to move in substantially only a longitudinal direction along said upper longitudinal linear structure (4), and said rectilinear body (1) being suspended and displacable along said upper longitudinal linear structure (4) via a pair of spaced apart rollers;
      a lower locking device (11) for immobilizing said rectilinear body (1) in a desired position;
      a movable support element (7) being slidably mounted within said rectilinear body (1), and the movable support element (7) having a device for immobilizing said support element (7) in a desired supporting position; and
      a device (6) for raising and lowering said movable support, and the device (6) for raising and lowering said movable support being powered by a motorized drive.

2. The stanchion for a transport vehicle according to claim 1, wherein an intermediate portion (5) of said rectilinear body (1) serves as a guide for said movable support element (7).

3. The stanchion for a transport vehicle according to claim 1, wherein said device (6) for raising and lowering further comprises:
   said movable support element (7);
   means for guiding said movable support element (7) along said rectilinear body (1);
   means (17) for driving said movable support element (7) along said rectilinear body (1);
   an interface (8) connected to said movable support element (7); and
   means for locking said movable support element (7) in a supporting position.

4. The stanchion for a transport vehicle according to claim 3, wherein said device (6) for raising and lowering said movable support comprises a screw (18) driving a supporting nut (19).

5. The stanchion for a transport vehicle according to claim 4, wherein said movable support element (7) is a translation block (32) forming a housing within which said supporting nut (19) floats and provides functional play between said housing and said supporting nut (19).

6. The stanchion for a transport vehicle according to claim 3, wherein said device (6) for raising and lowering said movable support is a chain mechanism (27) activating a translation block (32) which moves vertically along an intermediate portion (5) of said rectilinear body (1).

7. The stanchion for a transport vehicle according to claim 1, wherein said movable support element (7) is connected to a cargo carrying support (9).

8. The stanchion for a transport vehicle according to claim 3, wherein said movable support element (7) is connected to a cargo carrying support (9) proximal to said interface (8).

9. The stanchion for a transport vehicle according to claim 3, wherein said movable support element (7) is connected directly to a cargo carrying support (9).

10. The stanchion for a transport vehicle according to claim 1, wherein said stanchion is used in combination with a plurality of stanchions forming a support unit having a cargo carrying support (9), for carrying cargo, attached to said movable support element (7) of each said stanchion.

11. The stanchion for a transport vehicle according to claim 10, wherein said plurality of stanchions are positioned opposite each other in a transverse arrangement.

12. The stanchion for a transport vehicle according to claim 11, wherein said plurality of stanchions are functionally interconnected by a control device which synchronizes movement of said plurality of stanchions.

13. The stanchion for a transport vehicle according to claim 10, wherein said cargo carrying support (9) is articulatably connected to said movable support element (7).

14. The stanchion for a transport vehicle according to claim 11, wherein said plurality of stanchions are positioned opposite each other in a transverse arrangement and said movable support elements (7) are joined by a transverse cargo supporting structure (26) movable along each said stanchion, with one structure being provided between two stanchions.

15. The stanchion for a transport vehicle according to claim 14, wherein said transverse supporting structure (26) consists of two parallel elements in the form of bars (51, 52) maintained a constant distance from each other by a detachable cross piece (53) which is adjustable and which is located at each of a plurality of extremities of said supporting structure (26).

16. The stanchion for a transport vehicle according to claim 15, wherein said cross piece (53) is a rod transversely disposed in relation to said bars (51, 52) having angled extremities (54, 55) which lodge in openings at ends of said bars (51, 52), said extremities of said bars each being articulatably connected to a translation block (32) by two flat rods (49, 50) forming said interface (8), and including mechanism for absorbing transverse stress.

17. The stanchion for a transport vehicle according to claim 16, wherein said mechanism for absorbing transverse stress is a roller (56) rotating on said rod of each cross piece (53) which rolls directly along a front surface of an intermediate portion (5) of each of said rectilinear bodies (1) of said stanchions.

18. The stanchion for a transport vehicle according to claim 10, wherein a single cargo-carrying support is supported by at least two stanchions.

19. The stanchion for a transport vehicle according to claim 18, wherein each said cargo carrying support is supported by two stanchions.

20. The stanchion for a transport vehicle according to claim 10, wherein said plurality of stanchions support a single cargo carrying support.

21. The stanchion for a transport vehicle according to claim 10, wherein a single said cargo carrying support (9) is attached to said movable support element (7) of each stanchion.

22. A stanchion for a transport vehicle comprising:
a longitudinal linear structure (4) being integral with a body of said transport vehicle;
a rectilinear body (1) being suspended, by an upper extremity (2) thereof, from said linear longitudinal structure (4),
wherein the rectilinear body (1) comprises:
an upper engagement device (3) for translational displacement of the rectilinear body (1) along said upper longitudinal linear structure (4);
a lower locking device (11) for immobilizing said rectilinear body (1) in a desired position;
a movable support element (7) being slidably mounted within said rectilinear body (1), and the movable support element (7) having a device for immobilizing said support element (7) in a desired supporting position;
a device (6) for raising and lowering said movable support, and the device (6) for raising and lowering said movable support being powered by a motorized drive; and
said rectilinear body (1) surrounding said raising and lowering means (6) further comprising:
an upper extremity (2) displaceable along said upper longitudinal linear structure (4) attached to said vehicle body with displacement means;
a rectilinear intermediate portion (5) along which said movable support element (7) is vertically displaced; and
a lower extremity (10) comprising said lower locking device (11) for immobilizing said stanchion in an operative position on a lower longitudinal edge (12) of said vehicle body.

23. The stanchion for a transport vehicle according to claim 22, wherein said upper extremity (2), displaceable along said upper longitudinal linear structure (4) integral with said vehicle body, is adjustably fixable on said structure.

24. The stanchion for a transport vehicle according to claim 23, wherein said displaceable upper extremity (2) is immobilizeable along said upper longitudinal linear structure (4) using an upper immobilization means cooperating with said lower locking device (11).

25. The stanchion for a transport vehicle according to claim 24, wherein said displaceable upper extremity (2) is immobilized along said upper longitudinal linear structure (4) when a stop engages with an opening (45) subsequent to said lower extremity (10) being locked.

26. A stanchion for a transport vehicle comprising:
a longitudinal linear structure (4) being integral with a body of said transport vehicle;
a rectilinear body (1) being suspended, by an upper extremity (2) thereof, from said linear longitudinal structure (4),
wherein the rectilinear body (1) comprises:
an upper engagement device (3) for translational displacement of the rectilinear body (1) along said upper longitudinal linear structure (4);
a lower locking device (11) for immobilizing said rectilinear body (1) in a desired position;
a movable support element (7) being slidably mounted within said rectilinear body (1), and the movable support element (7) having a device for immobilizing said support element (7) in a desired supporting position;
a device (6) for raising and lowering said movable support, and the device (6) for raising and lowering said movable support being powered by a motorized drive; and
said rectilinear body (1) being a hollow element with two folded sides forming two parallel runners (21, 22) which guide a translation block (20) forming said movable support element (7).

* * * * *